June 27, 1967 W. A. BARBER ETAL 3,328,205
FUEL CELL CONTAINING A METALLIZED PAPER ELECTRODE
Filed July 1, 1963
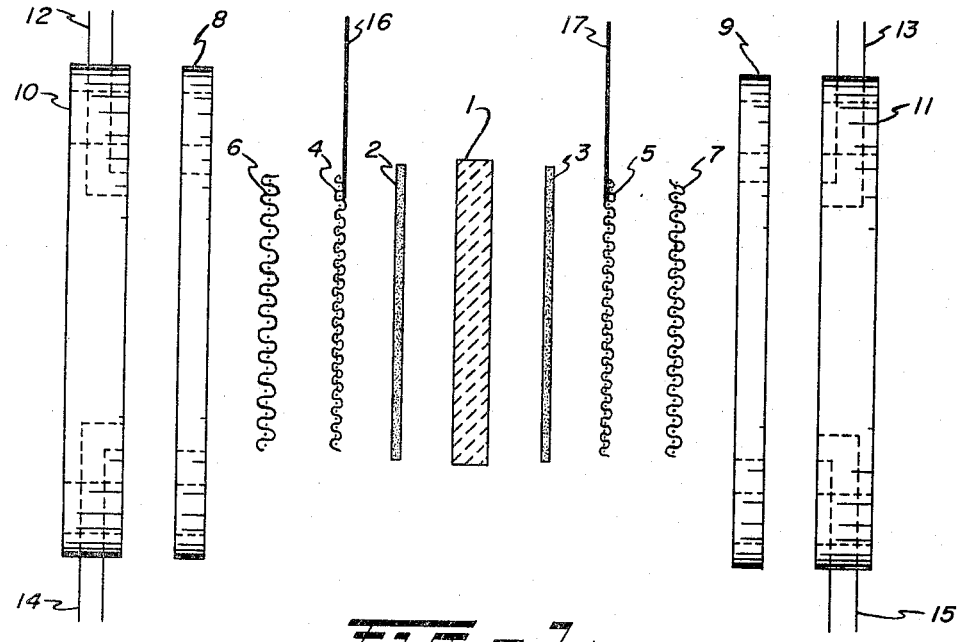
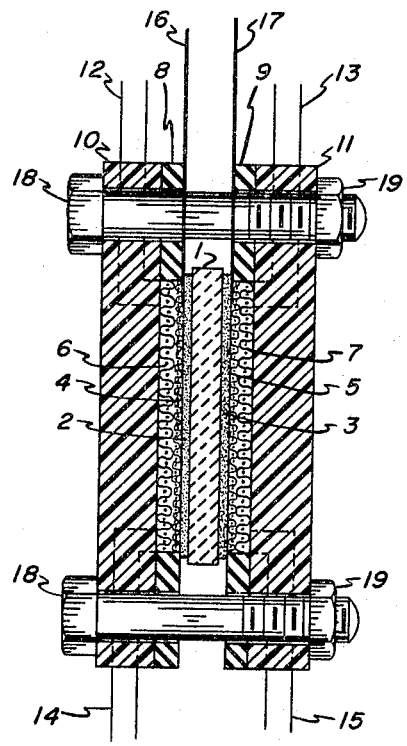
INVENTORS.
William A. Barber
Norman T. Woodberry
BY
*Harry S. Kline*
ATTORNEY

United States Patent Office 3,328,205
Patented June 27, 1967

3,328,205
FUEL CELL CONTAINING A METALLIZED PAPER ELECTRODE
William Austin Barber, Springdale, and Norman Thorndike Woodberry, Stamford, Conn., assignors to American Cyanamid Company, Stamford, Conn., a corporation of Maine
Filed July 1, 1963, Ser. No. 295,272
5 Claims. (Cl. 136—86)

This application is a continuation-in-part of our application, Ser. No. 247,238, filed on Dec. 26, 1962, now abandoned.

The present invention relates to novel metallized paper electrodes and methods for preparing the same. More particularly, the invention relates to novel metallized unfused, fibrillated paper electrodes suitable for use in fuel cells, and especially for use in hydrogen-oxygen containing gas fuel cells.

In the past, electrodes consisting of platinum black on a metal screen or a noble metal supported on carbon have been utilized in low temperature hydrogen-oxygen containing gas fuel cells. Unfortunately, such electrodes are not entirely satisfactory due to the difficulties encountered in making large area electrodes having uniform distribution of nobel metal, waterproofing agent and open areas or pores. Frequently, the noble metal to be distributed tends to agglomerate, and the surfaces of such electrodes suffer from excessive local reaction or hot spots during operation which causes fuel cell failure. Often, too, the waterproofing agent is poorly or unevenly distributed so that the electrode floods during operation. There exists a need for an electrode which can be employed in a fuel cell to give superior performance and long life due to inherently uniform distribution of components, such as active metal and waterproofing agents.

It is, therefore, a principal object of the present invention to provide an electrode in which the noble metal catalyst and its waterproofing agent are uniformly distributed therein. It is a further object to provide a fuel cell in which a noble metal catalyst and its waterpoofing agent are uniformly distributed on a support therefor. A still further object is to provide an improved method of manufacture of large, uniform electrodes. These and other objects will become apparent from a consideration of the ensuing detailed description.

To this end, it has been unexpectedly found that enhanced performance of a fuel cell can be readily achieved by providing a uniformly distributed noble metal catalyst on a fibrillated, unfused paper web substantially inert to aqueous mineral acids or bases. Such catalyst treated paper electrodes when prepared from suitable pulp are stable in a fuel cell in contact with the electrolyte and do not crumble or otherwise deteriorate under normal conditions of cell operations.

According to the process of the invention, a noble metal, such as for instance platinum, palladium and ruthenium, is employed in producing the metallized paper electrode. Metallization is accomplished by employing any fibrous pulp which will be stable under the conditions wherein it will be used. In acid electrolyte cells, for instance, an acrylic fiber plup can be employed, such as one prepared by the method disclosed in United States Letters Patent No. 2,810,646, issued on Oct. 22, 1957 to Wooding and Woodberry. This patent is incorporated herein by reference in its entirety. Other suitable fibrous materials which can be used particularly in alkali electrolyte cells include asbestos, polyvinylalcohol fiber and the like. Mixtures of glass or metal fibers, metal powders, or carbon and each of the aforementioned fibrillated fibers can be used advantageously.

Catalytic amounts of noble metal of from about twenty-five to about sixty-five percent, based on the weight of the over-all paper electrodes are deposited on the fibrous pulp with agitation in such a way as to insure that the material is uniformly distributed through the fibrous pulp mass and firmly affixed to the fibers of the pulp. The noble metal may be added to the pulp in the form of its halogenated salt, such as for instance chloroplatinic acid or potassium chloropaltinite. Platinum metal is subsequently obtained by reducing the halogenated acid or salt with any suitable reducing agent. Alternatively, the noble metal may be added directly to the pulp, as for instance in the form of platinum black. Advantageously, any method known in the art can be employed for ensuring the presence of active noble metal catalyst in the pulp mass.

In general, a water-proofing reagent is incorporated into the pulp prior to forming the electrodes. Reagents such as polytetrafluoroethylene, styrene-butadiene copolymer, neoprene and silicone rubber, can advantageously be so used. Usually, from 1% to 25% of water-proofing agent based on the overall electrode, is a good practice.

The metallized pulp mass can be readily formed into desired electrode sheets. In general, the pulp so-metallized is laid down as a uniform web on conventional paper making equipment and dried. Uniform distribution of catalytic active metal as well as uniform thickness of the resultant paper electrodes can be readily achieved.

In like manner, a unitary composite comprising an inner hydrophilic, non-catalytic fibrous layer and outer electrode layers as above defined can be prepared by pressing the layers together, drying at about 250° F. and thereafter equilibrating resultant composite with electrolyte.

In order to further clarify the invention utilizing a uniformly distributed, catalytic, metallized unfused, fibrillated sheet as an electrode, these and other embodiments of the invention are shown in the accompanying drawing and will be described in detail in conjunction with that drawing.

In the drawing:

FIG. 1 is an exploded plan view partially in section, of a fuel cell employing the electrode of the present invention; and FIG. 2 is a partially expanded side view, partially in section of the fuel cell of FIG. 1.

In FIG. 1, a membrane 1, is positioned between two of the metallized paper electrodes of this invention 2 and 3. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber gaskets. The seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17, connected onto current collector screens 4 and 5 are the conductive members through which current flows from and to the fuel cell via the external circuit when the latter is in operation. The cell is secured by means of bolts 18 and nuts 19 as shown in FIG. 2.

The invention will be illustrated in conjunction with the following examples which are to be taken as illustrative only and not by way of limitation. All parts are by weight, unless otherwise stated.

*Example 1*

This example illustrates the preparation of a metallized acrylic paper sheet containing 50 percent platinum metal uniformly distributed therethrough and possessing a uniform thickness.

Into a suitable reaction vessel equipped with stirrer are added 600 parts of a 0.68 percent solids aqueous suspension of beaten acrylic fibers prepared by reacting 90 parts of acrylonitrile and 10 parts of methyl acrylate in accordance with the method disclosed in United States Letters Patent No. 2,810,646, directed to the preparation of water-laid webs containing fibrillated wet-spun polyacrylonitrile filaments. Admixed therewith are 11 parts of chloroplatinic acid. Thereafter, 140 parts of a 5% solution of sodium borohydride are added dropwise with constant stirring. Metallic platinum is readily deposited on the pulp as evidenced by the presence of a black deposit on the pulp and a clear, colorless supernatant solution. Resultant suspension of black fiber is converted to a metallized acrylic paper sheet by employing a standard paper-making screen. Thereafter, the sheet is washed in water so as to remove water-soluble impurities and dried. The dry black sheet contains 50 percent platinum attached firmly to the fibers of the acrylic paper. Platinum is thus well distributed through the entire mass. A uniform thickness of 7 mils of the so-platinized acrylic sheet is also obtained.

Circular, one inch diameter electrodes are cut from the sheet and assembled in a hydrogen-oxygen fuel cell, as previously defined in the drawing above. Prolonged and enhanced performance of the cell with no development of hot spots on the surface of the electrode, is achieved. It is noted that performance of the cell in term of the maximum current density obtained is 60 milliamperes per square centimeter.

*Example 2*

Repeating the procedure of Example 1 in every detail, except that the acrylic pulp is subjected to a waterproofing treatment by introducing as an aqueous latex twenty percent of polytetrafluoroethylene as the waterproofing agent prior to platinum deposition, performance of the cell is about doubled after treatment.

*Example 3*

Substituting 3% of a 65/35 styrene-butadiene copolymer for the polytetrafluoroethylene in Example 2 and added as a 35% aqueous latex, the performance of the cell in terms of maximum current density obtained is 100 milliamperes per square centimeter.

*Example 4*

To 30 parts of a 4% suspension of a mixture of 75% unfibrillated acrylic pulp and 25% well beaten acrylic pulp in 60 parts distilled water is added 0.6% part of polytetrafluoroethylene, added as a 60% latex suspension in water. After stirring for fifteen minutes 3.2 parts chloroplatinic acid are added to the waterproofed pulp and reduced to metallic platinum by dropwise addition of 42 parts of a 5% solution of sodium borohydride. Resulting metallized and waterproofed pulp is then converted into a paper electrode by standard technique and dried. The dry electrode sheet has a platinum content of 7 mg. per square centimeter. This paper electrode sheet is tested by using a portion as both electrodes in a 1 inch hydrogen-oxygen fuel cell with 5 N $H_2SO_4$ electrolyte and gave a potential of .69 volt at 100 milliamperes per square centimeter.

*Example 5*

To 25 parts of a 5% suspension of well beaten polyvinyl alcohol fiber in 60 parts of distilled water is added 0.6 part polytetrafluoroethylene, added as a 60% latex in water. After 15 minutes stirring 3.2 parts of chloroplatinic acid is added and the platinum reduced by dropwise addition of 35 parts (by volume) of 5% sodium borohydride solution. Resultant black pulp containing catalysts and waterproofing agent is made into a paper electrode sheet by standard technique and dried to give an electrode with platinum loading of 7 mg. per square centimeter.

The paper electrode is next tested in a one inch diameter hydrogen-oxygen fuel cell with 5 N KOH and gave a potential of .68 volt at 100 milliamperes per square centimeter.

*Example 6*

To 15 parts of a 4% suspension of well beaten acrylic fiber in 60 parts of distilled water is added 0.3 part of polytetrafluoroethylene, added as a 60% latex in water. After stirring for 15 minutes 3.2 parts of chloroplatinic acid is added and the platinum reduced by dropwise addition of 37 parts of a 5% solution of sodium borohydride. The resulting black pulp containing catalyst and waterproofing agent is made into a paper electrode sheet by standard technique and dried to give an electrode 6 mils thick with platinum loading of 7 mg. per square centimeter. The paper was tested as an electrode in a one inch diameter hydrogen-oxygen fuel cell with 5 $N_4H_2SO_4$ and gave a potential of 0.56 volt at 200 milliamperes per square centimeter.

*Example 7*

1.2 parts of asbestos fiber is suspended in 100 parts of water and waterproofed by addition of 1 part polytetrafluoroethylene, added as a 60% latex in water. To the waterproofed mixture is added 3.2 parts of chloroplatinic acid and the platinum reduced by dropwise addition of 32 parts of a 5% solution of sodium borohydride. The resulting black pulp containing catalyst and waterproofing agent is made into a paper electrode sheet by standard technique and dried to give a weak electrode sheet with platinum loading of 7 mg. Pt per square centimeter. This paper was tested as an electrode in a one inch diameter hydrogen-oxygen fuel cell with 5 N KOH and gave a potential of 0.71 volt at 100 milliamperes per square centimeter.

Although noble metal catalysts have been exemplified, it is an advantage of the present invention that metals other than noble metals may be incorporated, so as to provide for a uniformly distributed metal on a suitable support. Consequently, metals of the Group VIII, e.g., iron, cobalt, and nickel, or metals of Group I–B of the Periodic Table, e.g., copper, silver and gold, particularly in the form of their acetates or nitrates can be reduced on the pulp to effect equal distribution of the catalyst throughout the mass. Large sheets of uniform thickness and uniformly distributed metal catalyst can be obtained in a simple straightforward manner without utilizing expensive molding procedures with attendant loss of uniform thickness and distribution of metal catalyst.

In the following examples, unitary cell structures are exemplified.

*Example 8*

Two wet paper electrode sheets are formed following the procedure of Example 2 in every detail, except that between them is placed a third sheet containing 67% acrylic fiber and 33% glass fiber formed into a wet sheet. The composite is pressed and dried as a unitary 3-ply sheet containing in both electrode layers 7 milligrams platinum per square centimeter of surface area. The dry composite sheet is then shaped into discs and assembled in a fuel cell shown in FIG. 2. This composite sheet is next equilibrated with 5 N sulfuric acid. The composite is tested in a one inch diameter hydrogen-oxygen fuel cell as described in Example 2. This cell gives a voltage of 0.52 volt at a current of 100 milliamperes per square centimeter and 0.31 volt at 190 milliamperes per square centimeter.

*Example 9*

Two wet paper electrode sheets are prepared using a pulp mixture consisting of 75% asbestos and 25% polyvinyl alcohol fiber by the reduction procedure similar in all particulars to the procedure used in Example 2, above. Between these two sheets is placed a third sheet containing 75% asbestos and 25% polyvinyl alcohol fiber formed into a wet sheet. Resultant composite is pressed, dried and tested as in Example 8, above, employing 5 N potassium hydroxide in lieu of 5 N sulfuric acid and gives 0.70 volt at 100 milliamperes per square centimeter and 0.54 volt at 200 milliamperes per square centimeter.

We claim:

1. A fuel cell comprising in combination: a porous, hydrophilic, non-catalytic, electrolyte-containing matrix and a metallized paper electrode, said electrode comprising: (a) an unfused, fibrillated, substantially hydrophobic paper sheet as a support for an active metal catalyst uniformly distributed therethrough and (b) an active metal catalyst present in said sheet in an amount ranging from about 25% to about 65%, based on the weight of the overall resultant electrode sheet, said matrix being in direct contact with said electrode.

2. The fuel cell according to claim 1 in which the active metal of said electrode is a noble metal selected from the class consisting of platinum, palladium and ruthenium.

3. The fuel cell according to claim 1, in which the paper sheet is prepared from water-laid webs containing fibrillated wet-spun filaments containing at least about 85% polyacrylonitrile.

4. The fuel cell according to claim 1 in which the paper sheet is prepared from a mixture of fibrillated wet-spun filaments and unfibrillated filaments.

5. An improved fuel cell comprising as the electrode and matrix therein a composite laminated structure, said structure comprising a laminate of a hydrophilic, non-catalytic, electrolyte-equilibrated fibrous layer positioned between two electrodes, each of said electrodes comprising: (a) an unfused, fibrillated, substantially hydrophobic paper sheet as a support for an active metal catalyst uniformly distributed therethrough and (b) an active metal catalyst present in said sheet in an amount ranging from about 25% to about 65%, based on the weight of said electrode sheet.

References Cited

UNITED STATES PATENTS

| | | | |
|---|---|---|---|
| 2,444,896 | 7/1948 | Shreir | 162—181 X |
| 2,650,163 | 8/1953 | Horsey et al. | 162—169 |
| 2,810,644 | 10/1957 | Shearer | 162—157 |
| 2,810,645 | 10/1957 | Houghton | 162—157 |
| 2,810,646 | 10/1957 | Wooding et al. | 162—207 X |
| 2,866,769 | 12/1958 | Happoldt | 162—169 X |
| 3,014,818 | 12/1961 | Campbell | 117—160 X |
| 3,093,609 | 6/1963 | Feigley et al. | 162—169 X |
| 3,098,786 | 7/1963 | Biles et al. | 162—157 |
| 3,117,034 | 1/1964 | Tirrell | 136—86 |
| 3,223,556 | 12/1965 | Cohn et al. | 136—86 |

OTHER REFERENCES

15th Annual Power Sources, PSC Publications, May 1961, pages 13 and 14.

WINSTON A. DOUGLAS, *Primary Examiner.*

ALLEN B. CURTIS, *Examiner.*